Nov. 1, 1932.  A. BIZZARRI  1,885,220
HYDRAULIC GREASE DISPENSING SYSTEM
Filed Aug. 13, 1931
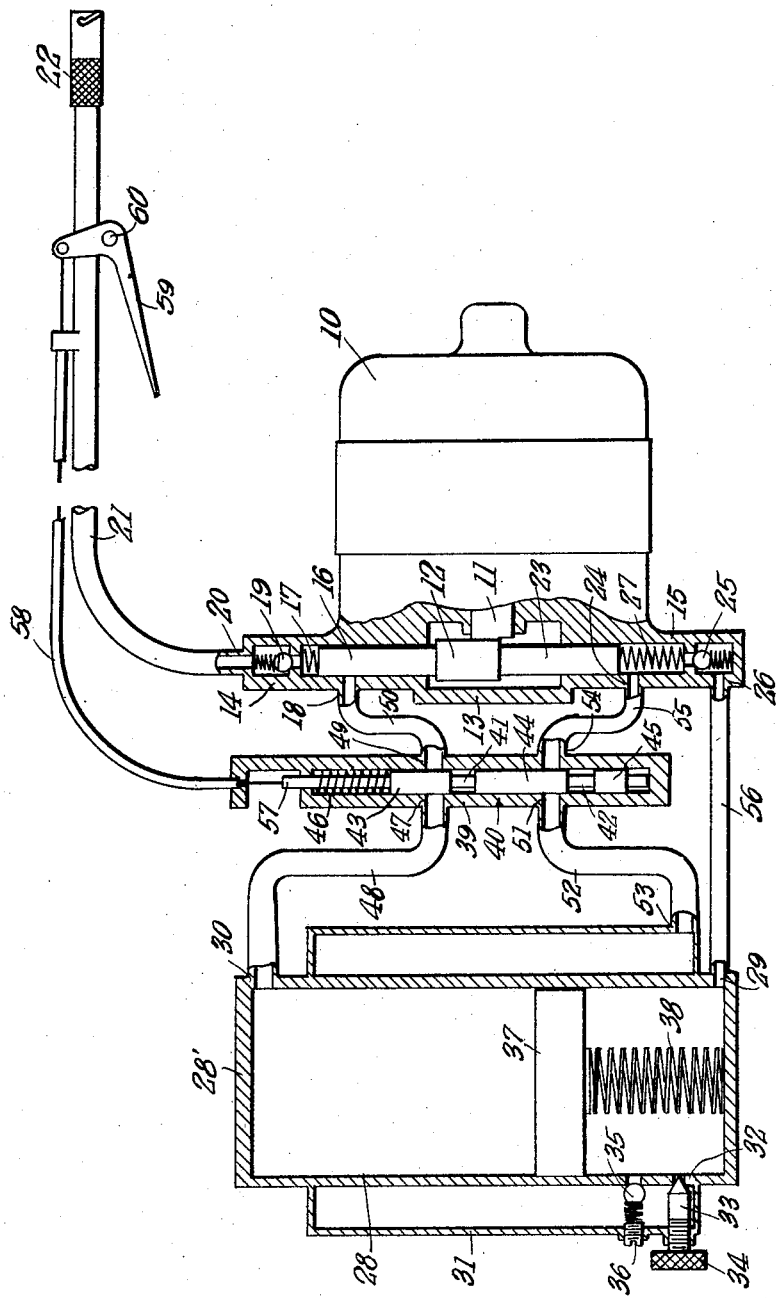
INVENTOR.
Anthony Bizzarri
BY
Edward M. Evarts
ATTORNEY Patented Nov. 1, 1932

1,885,220

UNITED STATES PATENT OFFICE

ANTHONY BIZZARRI, OF NEW YORK, N. Y.

HYDRAULIC GREASE DISPENSING SYSTEM

Application filed August 13, 1931. Serial No. 556,755.

My present invention relates to grease dispensing devices, and more particularly, to such devices as may be actuated by hydraulic pressure. I have found that when handling heavy greases such as those used for the lubrication of differential mechanisms of motor vehicles, it is necessary to employ considerable pressure to expel the heavy grease from its container and inject the same into the differential casing. However, by means of the present invention, I provide hydraulically actuated means whereby the ejection of the heavy grease is readily accomplished. In the accompanying specification I shall describe, and in the annexed drawing show an illustrative embodiment of the hydraulically actuated grease dispensing devices of the present invention. It is, however, to be clearly understood that I do not wish to be limited to the exact details of the aforesaid illustrative embodiment herein shown and described for purposes of illustration only.

It is the main object of my present invention to provide devices of the general character specified which are simple in construction, easy and economical to fabricate and assemble, and which are admirably adapted to perform their intended functions, to eliminate the difficulties experienced with existing devices for like purposes. Other objects and advantages of the present invention will in part be pointed out in detail hereinafter, and will in part be obvious to those skilled in the art to which the present invention relates.

In the accompanying drawing, the single figure shows a partial side elevational, partial longitudinal sectional view of the aforesaid illustrative embodiment of the present invention, a part thereof being diagrammatic.

Referring now more in detail to the aforesaid illustrative embodiment of the hydraulically actuated grease-dispensing devices of the present invention, and with particular reference to the drawing illustrating the same, the numeral 10 generally designates an electric motor, on the shaft 11 of which is secured an eccentric cam 12. Associated with the motor 11, is an eccentric housing 13 with which there may be integrally formed a pair of cylinders 14 and 15. It will be noted that the cylinders 14 and 15 are oppositely disposed, so that when the eccentric 12 is rotated, the plungers with which the cylinders 14 and 15 are provided are alternately actuated, the arrangement being such that while one pump is intaking the other is dispensing, and vice versa.

The cylinder 14 has operable therein a plunger 16, the lower end of which is maintained at all times in contact with the eccentric 12, within the housing 13, by means of an expansion spring 17. This cylinder is also provided with an inlet 18 for heavy grease, a check valve 19, and an outlet 20 for the heavy grease referred to. The outlet 20 is connected to a flexible hose 21, or any other grease conveying means, on the outer end of which a fitting, or adapter 22 may be secured, this hose being adapted to convey the grease ejected by the pump plunger 16 to wherever the grease is to be used, for example, in lubricating the differential mechanism of a motor vehicle.

The cylinder 15 is provided with a plunger 23, an inlet 24, check valve 25, an outlet 26. The plunger 23 is always maintained in contact with the eccentric 12 within the housing 13, by means of the expansion spring 27.

This completes the description of the pump mechanism constituting part of the aforesaid illustrative embodiment of the present invention, and I shall now describe the storing means, which I prefer to use in connection with the aforesaid illustrative embodiment of the present invention. Such storing means may consist of a container 28 in the form of a cylinder, said container having near the lower end thereof an inlet 29, and adjacent the upper end thereof an outlet 30. Surrounding the container 28, I provide an annular chamber 31, this chamber communicating with the container 28 by way of the port 32 controlled by a needle valve 33, the outer end of which is provided with a knurled knob 34. This port is normally closed. The cylindrical container 28 is further in communication with the annular container 31 by means of the check valve 35, the operating pressure of which is controlled by the set screw 36. The container 28 is receptive of heavy grease such as that used for the lubrication of differential mechanism of motor vehicles, and the annular chamber or reservoir 31 is adapted to store a light oil or other fluid intended to be utilized to develop hydraulic pressure for the ejection of the heavy grease to be contained in the cylindrical container 28. Operable in the cylinder 28 is a piston 37, said piston being normally retained in the lower portion of the cylindrical container 28 by means of a tension spring 38. This completes the description of the storing means which I prefer to use for the aforesaid illustrative embodiment of the present invention, and I shall now describe the means for controlling the flow of the grease and the hydraulic fluid which I prefer to utilize in the present invention. Such means may consist of a cylinder 39 in which there may be operable a cylindrical valve generally designated by the reference character 40. Such valve preferably consists of a cylindrical rod having reduced portions 41 and 42 so spaced as to present three valve portions 43, 44 and 45, the diameters of which are such as to snugly fit in the cylinders 39. The valve 40 is normally maintained in such a position as to close the outlets and inlets of the cylinder 39, which will later be described, by means of an expansion spring 46. The cylinder 39 is provided with an inlet 47 connected by a pipe 48 with the outlet 30 of the container 28. Directly opposite the inlet 47 the cylinder 39 is provided with an outlet 49 by a pipe 50 with the inlet 18 of the cylinder 14. An additional inlet 51, with which the cylinder 39 is provided, is connected by a pipe 52 with an outlet 53 formed in the annular chamber or reservoir 31, and oppositely disposed to the inlet 51, the cylinder 39 is provided with an outlet 54 connected by a pipe 55 with the inlet 24 of the cylinder 15. Finally, the outlet 26 of the cylinder 15 is connected by a pipe 56 with the inlet 29 of the container 28.

The valve 40 is provided with a rod 57, the outer end of which is secured to a Bowdin cable 58, the opposite end of which is secured to a bell crank lever 59, pivoted at 60 on the flexible hose 21, the arrangement being such that after the adapter 22, which is carried by the hose has been connected with the fitting to be lubricated, the lever 59 may be depressed to move the valve 40 as will hereinafter be described.

This completes the description of the aforesaid illustrative embodiment of the present invention, and while the operation and mode of use thereof are believed to be readily apparent from the foregoing description, the same may be briefly summarized as follows:

As already stated, prior to using the device, the piston 37 is retained in the lower portion of the cylinder 28 by the tension spring 38. The cylinder 28 is loaded by removing the upper portion 28' thereof (here shown as being diagrammatic) and placing the heavy grease in the same until it comes to rest in the upper surface of the piston 37. Thereafter the upper end of the cylinder 28 is replaced and the device is then loaded and ready for use. It will be noted that prior to actual use, valve portion 43 closes the communication between the pipes 57 and 50, and the valve portion 44 closes the connection between the pipes 52 and 55. It is intended that the motor 10 be in operation at all times, it being believed to be unnecessary to here show that the motor is, of course, connected with the source of electrical current. With the motor running, let us assume that it is desired to lubricate the differential mechanism or any other apparatus requiring heavy grease lubrication. The adapter 22 is connected with the fitting with which the differential casing or the like is usually provided. The motor, being in operation, through the eccentric 12, will be operating the pump plungers 16 and 23, although no grease or oil will be pumped because of the position of the valve portions 43 and 44. As soon as the lever 59 is depressed, the valve 40 will be moved against the action of the spring 46 so that the valve portions 43 and 44 will no longer respectively close the communications between the pipes 57 and 50, and 52 and 55, so that the light oil from the reservoir 31 will pass out of the same by way of the outlet 53, pipe 52, inlet 51, outlet 54, pipe 55 and inlet 24 into the cylinder 15. From this point, the plunger 23 will pump the light oil past the check valve 25 out of the cylinder 15 by way of the outlet 26, pipe 56 and inlet 29 into the lower end of the container 28 beneath the pistons 37. As soon as sufficient pressure is built up beneath the piston 37, said piston will be moved upwardly against the action of the spring 38, to force the heavy grease contained in the cylindrical container 28 out of the same by way of the outlet 30, pipe 48, inlet 47, outlet 49, pipe 50 and inlet 18 into the grease pump 14. From this point, the plunger 16 will force the grease past the check valve 19, and out of the cylinder 14 by way of the outlet 20, flexible hose 21, adapter 22, and into the fitting (not shown) with which the apparatus being lubricated is provided. As soon as the lubrication is completed, all that need be done to stop the flow is to release the lever 59. This will close the valve portions 43 and 44, so that although the motor 10, and the pump plungers 16 and 23 will continue to operate, no further grease or hydraulic fluid will be withdrawn from the container 28 and reservoir 31.

Should the pressure in the cylinder 28 become too great, the excess oil in the lower end of the container 28, beneath the piston 37, will pass the check valve 35 and be returned to the reservoir 31. After all of the grease has been expelled from the cylindrical container 28, the needle valve 33 may be opened to permit the oil in the container 28 beneath the piston 37 to pass by way of the port 32 out of said container and back into the reservoir 31. Of course, as the oil leaves the container 28, the piston 37 will be returned by the action of the spring 38, to its normal lower position.

This completes the description of the mode of operation and use of the aforesaid illustrative embodiment of the grease dispensing devices of the present invention, and it will be noted from all of the foregoing that the devices of the present invention are simple in construction, easy and economical to fabricate and assemble, and admirably adapted to perform their intended functions. Other superiorities and advantages of the devices of the present invention will readily occur to those skilled in the art to which the present invention relates.

What I claim as my invention is:

1. A hydraulic grease dispensing device, comprising a grease-containing reservoir, a piston operable in said grease-containing reservoir, a fluid-containing chamber, means communicating with said grease-containing reservoir to eject the grease therefrom under pressure, means communicating with said fluid-containing chamber to force the fluid therein beneath the piston in said grease-containing reservoir, and means to control the communications between said grease-containing reservoir and said first named means, and said fluid-containing chamber and said second named means.

2. A hydraulic grease dispensing device, comprising a grease-containing reservoir, a piston operable in said grease-containing reservoir, a fluid-containing chamber, pumping means communicating with said grease-containing reservoir to eject the grease therefrom under pressure, means communicating with said fluid-containing chamber to force the fluid therein beneath the piston in said grease-containing reservoir, and means to control the communications between said grease-containing reservoir and said first named means, and said fluid-containing chamber and said second named means.

3. A hydraulic grease dispensing device, comprising a grease-containing reservoir, a piston operable in said grease-containing reservoir, a fluid-containing chamber, an eccentrically actuated grease pump communicating with said grease-containing reservoir to eject the grease therefrom under pressure, means communicating with said fluid-containing chamber to force the fluid therein beneath the piston in said grease-containing reservoir, and means to control the communications between said grease-containing reservoir and said first named means, and said fluid-containing chamber and said second named means.

4. A hydraulic grease dispensing device, comprising a grease-containing reservoir, a piston operable in said grease-containing reservoir, a fluid-containing chamber, means communicating with said grease-containing reservoir to eject the grease therefrom under pressure, pumping means communicating with said fluid-containing chamber to force the fluid therein beneath the piston in said grease-containing reservoir, and means to control the communications between said grease-containing reservoir and said first named means, and said fluid-containing chamber and said second named means.

5. A hydraulic grease dispensing device, comprising a grease-containing reservoir, a piston operable in said grease-containing reservoir, a fluid-containing chamber, means communicating with said grease-containing reservoir to eject the grease therefrom under pressure, an eccentrically actuated fluid pump communicating with said fluid-containing chamber to force the fluid therein beneath the piston in said grease-containing reservoir, and means to control the communications between said grease-containing reservoir and said first named means, and said fluid-containing chamber and said second named means.

6. A hydraulic grease dispensing device, comprising a grease-containing reservoir, a piston operable in said grease-containing reservoir, a fluid-containing chamber, pumping means communicating with said grease-containing reservoir to eject the grease therefrom under pressure, pumping means communicating with said fluid-containing chamber to force the fluid therein beneath the piston in said grease-containing reservoir, and means to control the communications between said grease-containing reservoir and said first named means, and said fluid-containing chamber and said second named means.

7. A hydraulic grease dispensing device, comprising a grease-containing reservoir, a piston operable in said grease-containing reservoir, a fluid-containing chamber, an eccentrically actuated grease pump communicating with said grease-containing reservoir to eject the grease therefrom under pressure, pumping means communicating with said fluid-containing chamber to force the fluid therein beneath the piston in said grease-containing reservoir, and means to control the communications between said grease-containing reservoir and said first named means, and said fluid-containing chamber in said second named means.

8. A hydraulic grease dispensing device, comprising a grease-containing reservoir, a piston operable in said grease-containing reservoir, a fluid-containing chamber pumping means communicating with said grease-containing reservoir to eject the grease therefrom under pressure, an eccentrically actuated fluid pump communicating with said fluid-containing chamber to force the fluid therein beneath the piston in said grease-containing reservoir, and means to control the communications between said grease-containing reservoir and said first named means, and said fluid-containing chamber and said second named means.

9. A hydraulic grease dispensing device, comprising a grease-containing reservoir, a piston operable in said grease-containing reservoir, a fluid-containing chamber, an eccentrically actuated grease pump communicating with said grease-containing reservoir to eject the grease therefrom under pressure, an eccentrically actuated fluid pump communicating with said fluid-containing chamber to force the fluid therein beneath the piston in said grease-containing reservoir, and means to control the communications between said grease-containing reservoir and said first named means, and said fluid-containing chamber and said second named means.

10. A hydraulic grease dispensing device, comprising a grease-containing reservoir, a piston operable in said grease-containing reservoir, a fluid-containing chamber, means communicating with said grease-containing reservoir to eject the grease therefrom under pressure, means communicating with said fluid-containing chamber to force the fluid therein beneath the piston in said grease containing reservoir, and a pair of valves to control the communications between said grease-containing reservoir and said first named means, and said fluid-containing chamber and said second named means.

11. A hydraulic grease-dispensing device, comprising a grease-containing reservoir, a piston operable in said grease-containing reservoir, a fluid-containing chamber, pumping means communicating with said grease-containing reservoir to eject the grease therefrom under pressure, means communicating with said fluid-containing chamber to force the fluid therein beneath the piston in said grease-containing reservoir, and a pair of valves to control the communications between said grease-containing reservoir and said first named means, and said fluid-containing chamber and said second named means.

12. A hydraulic grease dispensing device, comprising a grease-containing reservoir, a piston operable in said grease-containing reservoir, a fluid-containing chamber, an eccentrically actuated grease pump communicating with said grease-containing reservoir to eject the grease therefrom under pressure, means communicating with said fluid-containing chamber to force the fluid therein beneath the piston in said grease-containing reservoir, and a pair of valves to control the communications between said grease-containing reservoir and said first named means, and said fluid-containing chamber and said second named means.

13. A hydraulic grease dispensing device, comprising a grease-containing reservoir, a piston operable in said grease-containing reservoir, a fluid-containing chamber, means communicating with said grease-containing reservoir to eject the grease therefrom under pressure, pumping means communicating with said fluid-containing chamber to force the fluid therein beneath the piston in said grease-containing reservoir, and a pair of valves to control the communications between said grease-containing reservoir and said first named means, and said fluid-containing chamber and said second named means.

14. A hydraulic grease dispensing device, comprising a grease-containing reservoir, a piston operable in said grease-containing reservoir, a fluid-containing chamber, means communicating with said grease-containing reservoir to eject the grease therefrom under pressure, an eccentrically actuated fluid pump communicating with said fluid-containing chamber to force the fluid therein beneath the piston in said grease-containing reservoir, and a pair of valves to control the communications between said grease-containing reservoir and said first named means, and said fluid-containing chamber and said second named means.

15. A hydraulic grease dispensing device, comprising a grease-containing reservoir, a piston operable in said grease-containing reservoir, a fluid-containing chamber, pumping means communicating with said grease-containing reservoir to eject the grease therefrom under pressure, pumping means communicating with said fluid-containing chamber to force the fluid therein beneath the piston in said grease-containing reservoir, and a pair of valves to control the communications between said grease-containing reservoir and said first named means, and said fluid-containing chamber and said second named means.

16. A hydraulic grease dispensing device, comprising a grease-containing reservoir, a piston operable in said grease containing reservoir, a fluid-containing chamber, pumping means communicating with said grease-containing reservoir to eject the grease therefrom under pressure, an eccentrically actuated fluid pump communicating with said fluid-containing chamber to force the fluid therein beneath the piston in said grease-containing reservoir, and a pair of valves to control the communications between said grease-containing reservoir and said first named means, and said fluid-containing chamber and said second named means.

17. A hydraulic grease dispensing device, comprising a grease-containing reservoir, a piston operable in said grease-containing reservoir, a fluid-containing chamber, means communicating with said grease-containing reservoir to eject the grease therefrom under pressure, means communicating with said fluid-containing chamber to force the fluid therein beneath the piston in said grease-containing reservoir, a pair of valves to control the communications between said grease-containing reservoir and said first named means, and said fluid-containing chamber and said second named means, and manually actuated means to simultaneously control said valves.

18. A hydraulic grease dispensing device, comprising a grease-containing reservoir, a piston operable in said grease-containing reservoir, a fluid-containing chamber, an eccentrically actuated grease pump communicating with said grease containing reservoir to eject the grease therefrom under pressure, an eccentrically actuated fluid pump communicating with said fluid-containing chamber to force the fluid therein beneath the piston in said grease-containing reservoir, a pair of valves to control the communications between said grease-containing reservoir and said first named means, and said fluid-containing chamber and said second named means, and manually actuated means to simultaneously control said valves.

19. A hydraulic grease dispensing device, comprising a grease-containing reservoir, a piston operable in said grease-containing reservoir, a fluid-containing chamber, means communicating with said grease-containing reservoir to eject the grease therefrom under pressure, an eccentrically actuated fluid pump communicating with said fluid-containing chamber to force the fluid therein beneath the piston in said grease-containing reservoir, a pair of valves to control the communications between said grease-containing reservoir and said first named means and said fluid-containing chamber and said second named means, and manually actuated means to simultaneously control said valves.

20. A hydraulic grease dispensing device, comprising a grease-containing reservoir, a piston operable in said grease-containing reservoir, a fluid-containing chamber, pumping means communicating with said grease-containing reservoir to eject the grease therefrom under pressure, pumping means communicating with said fluid-containing chamber to force the fluid therein beneath the piston in said grease-containing reservoir, a pair of valves to control the communications between said grease-containing reservoir and said first named means, and said fluid-containing chamber and said second named means, and manually actuated means to simultaneously control said valves.

In testimony, whereof, I have signed my name to this specification this 3rd day of Aug., 1931.

ANTHONY BIZZARRI.